US010002138B2

United States Patent
Littlejohn et al.

(10) Patent No.: US 10,002,138 B2
(45) Date of Patent: Jun. 19, 2018

(54) MANAGING SPOT BLOCKS

(71) Applicant: iHeartMedia Management Services, Inc., San Antonio, TX (US)

(72) Inventors: Jeffrey Lee Littlejohn, Cincinnati, OH (US); David C Jellison, Jr., Ogallala, NE (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 92 days.

(21) Appl. No.: 15/135,162

(22) Filed: Apr. 21, 2016

(65) Prior Publication Data

US 2016/0239485 A1   Aug. 18, 2016

Related U.S. Application Data

(63) Continuation of application No. 13/943,280, filed on Jul. 16, 2013, now Pat. No. 9,323,788, which is a continuation-in-part of application No. 12/624,252, filed on Nov. 23, 2009, now Pat. No. 8,495,676.

(51) Int. Cl.
| | |
|---|---|
| *G06F 17/30* | (2006.01) |
| *H04H 20/10* | (2008.01) |
| *H04H 20/24* | (2008.01) |
| *H04H 60/06* | (2008.01) |
| *H04H 60/21* | (2008.01) |
| *H04H 60/82* | (2008.01) |

(52) U.S. Cl.
CPC ...... *G06F 17/302* (2013.01); *G06F 17/30023* (2013.01); *G06F 17/30283* (2013.01); *H04H 20/103* (2013.01); *H04H 20/24* (2013.01); *H04H 60/06* (2013.01); *H04H 60/21* (2013.01); *H04H 60/82* (2013.01)

(58) Field of Classification Search
CPC ............ H04N 21/812; H04N 21/4331; H04N 21/435; H04N 21/235; H04N 7/165; H04N 7/17318; G06Q 30/02; G06Q 30/0241; G06Q 30/0277; G06Q 30/0251; G06Q 30/0269

See application file for complete search history.

(56) References Cited

U.S. PATENT DOCUMENTS

| | | |
|---|---|---|
| 6,338,043 B1 | 1/2002 | Miller |
| 7,657,337 B1 | 2/2010 | Evans et al. |
| 7,853,969 B2 | 12/2010 | Smith et al. |
| 8,032,580 B2 | 10/2011 | Slik |

(Continued)

*Primary Examiner* — Ngoc K Vu
(74) *Attorney, Agent, or Firm* — Garlick & Markison; Edward J. Marshall

(57) ABSTRACT

A media automation system can provide a common program to multiple different servers, for example a terrestrial broadcast radio server and a streaming radio server. Each of the different servers can receive different content blocks to be inserted during breaks in the common program. Media items from existing content blocks can be removed, and different items inserted. If a content block is under-filled, media items can be inserted without removing existing media items. When items are removed or added to a content block, the removal can be reported to a traffic and billing system for appropriate action. Content blocks can be customized by removing or inserting items based on information obtained from a cloud-based application, or some other source.

20 Claims, 4 Drawing Sheets

(56) References Cited

U.S. PATENT DOCUMENTS

| | | | |
|---|---|---|---|
| 8,495,676 B2 | 7/2013 | Littlejohn et al. | |
| 9,323,788 B2 * | 4/2016 | Littlejohn | G06F 17/30283 |
| 2005/0060229 A1 | 3/2005 | Riedl et al. | |
| 2006/0212348 A1 | 9/2006 | Lambert et al. | |
| 2008/0189178 A1 | 8/2008 | Schepers et al. | |
| 2009/0125609 A1 | 5/2009 | Wood et al. | |
| 2010/0017298 A1 | 1/2010 | Stukenborg et al. | |
| 2010/0114715 A1 | 5/2010 | Schuster et al. | |
| 2010/0205049 A1 | 8/2010 | Long et al. | |
| 2011/0029373 A1 | 2/2011 | Steelberg et al. | |
| 2011/0087509 A1 | 4/2011 | Schepers et al. | |
| 2011/0138413 A1 * | 6/2011 | Hjelm | H04N 7/17318 725/34 |
| 2012/0060184 A1 * | 3/2012 | Nguyen | H04H 60/00 725/36 |
| 2013/0024287 A1 | 1/2013 | MacNeille et al. | |
| 2013/0298199 A1 * | 11/2013 | Lord | H04L 63/20 726/4 |

\* cited by examiner

MANAGING SPOT BLOCKS

CROSS REFERENCE TO RELATED APPLICATIONS

The present U.S. Utility Patent Application claims priority pursuant to 35 U.S.C. § 120 as a continuation of U.S. Utility application Ser. No. 13/943,280 entitled "Managing Under-Filled Spot Blocks," filed Jul. 16, 2013, which claims priority pursuant to 35 U.S.C. § 120 as a continuation-in-part of U.S. Utility application Ser. No. 12/624,252 entitled "Managing Under-Filled Spot Blocks," filed Nov. 23, 2009, now U.S. Pat. No. 8,495,676, both of which are hereby incorporated herein by reference in their entirety and made part of the present U.S. Utility Patent Application for all purposes.

FIELD

The present disclosure relates generally to scheduling blocks of media content, and more particularly to managing under-filled content blocks.

BACKGROUND

Media items in a broadcast schedule, for example music, talk, promotions, advertisements, and the like, are often broadcast in a group, or "content block." These content blocks may be scheduled during breaks between programming that is being broadcast to multiple different media outlets or stations. For example, a nationally syndicated program may be broadcast on various different local stations, in addition to being streamed over the Internet. In such cases, it can be desirable to have different media items played to different audiences during breaks in the nationally syndicated program. Different media items can be inserted into different content blocks played during the same block of time, so that a content block broadcast over the air to a radio audience may include different media items than a content block streamed to an Internet audience, even though the remainder of the content being broadcast is the same.

Situations can arise in which a broadcast content block needs to be modified. For example, one or more media items in a content block following a program segment may need to be removed, or "bumped."

SUMMARY

Media items removed, or "bumped" from earlier content blocks can be, in some cases, almost immediately rescheduled for inclusion in suitable, later scheduled content blocks. At least some embodiments of the present disclosure provide for a rules-based process for handling under-filled content blocks that can be implemented with little or no human intervention, thereby allowing quick placement of bumped media items into under-filled content blocks. In various embodiments, such a process can be implemented to enable near-real-time filling of a missing or under-filled content block to enhance realization of revenue from revenue generating content blocks.

A method for use in a media automation system includes receiving a message identifying media items available for insertion in an under-filled content block and responding to the message by: 1) selecting at least one media item of the plurality of media items available for insertion in the under-filled content block; 2) and transmitting a signal identifying the at least one media item selected by the media automation system for inclusion in the under-filled content block.

In some embodiments, the message identifying media items is produced in response to a cloud-based application sending a request for available media items. The cloud-based application can also send other information, for example media consumer (e.g. listener) preferences, to the media automation system, which uses the information from the cloud-based application to deliver personalized content blocks to a user of the cloud based application.

The media automation system can also remove media items already included in existing content blocks, and substitute better media items in the content block, where a "better" media item can be, for example, a more recent or more accurately targeted media item. Thus for example, an updated item of perishable content, for example a news story or traffic report, can be considered to be "better" than an outdated version of that same news story or traffic report. A notification can be provided to a media traffic system identifying removed and added media items or other content.

In various implementations, messages received or delivered by various parts of a media automation system can include commercial content, non-commercial content, and in some instances non-commercial content that is associated with commercial content by the automation system. Various requests can also specify whether non-commercial content associated with commercial content should also be provided in response to a request for commercial content.

The media automation system can include a traffic and billing system, a database server that selects media items for inclusion in content blocks, and multiple audio servers that receive a common media program. The different servers, although receiving the same media program, can receive different blocks of content to be inserted into the common media program. In at least one embodiment, both audio servers are under common control, while in other embodiments, one audio server operates under control of the other audio server.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
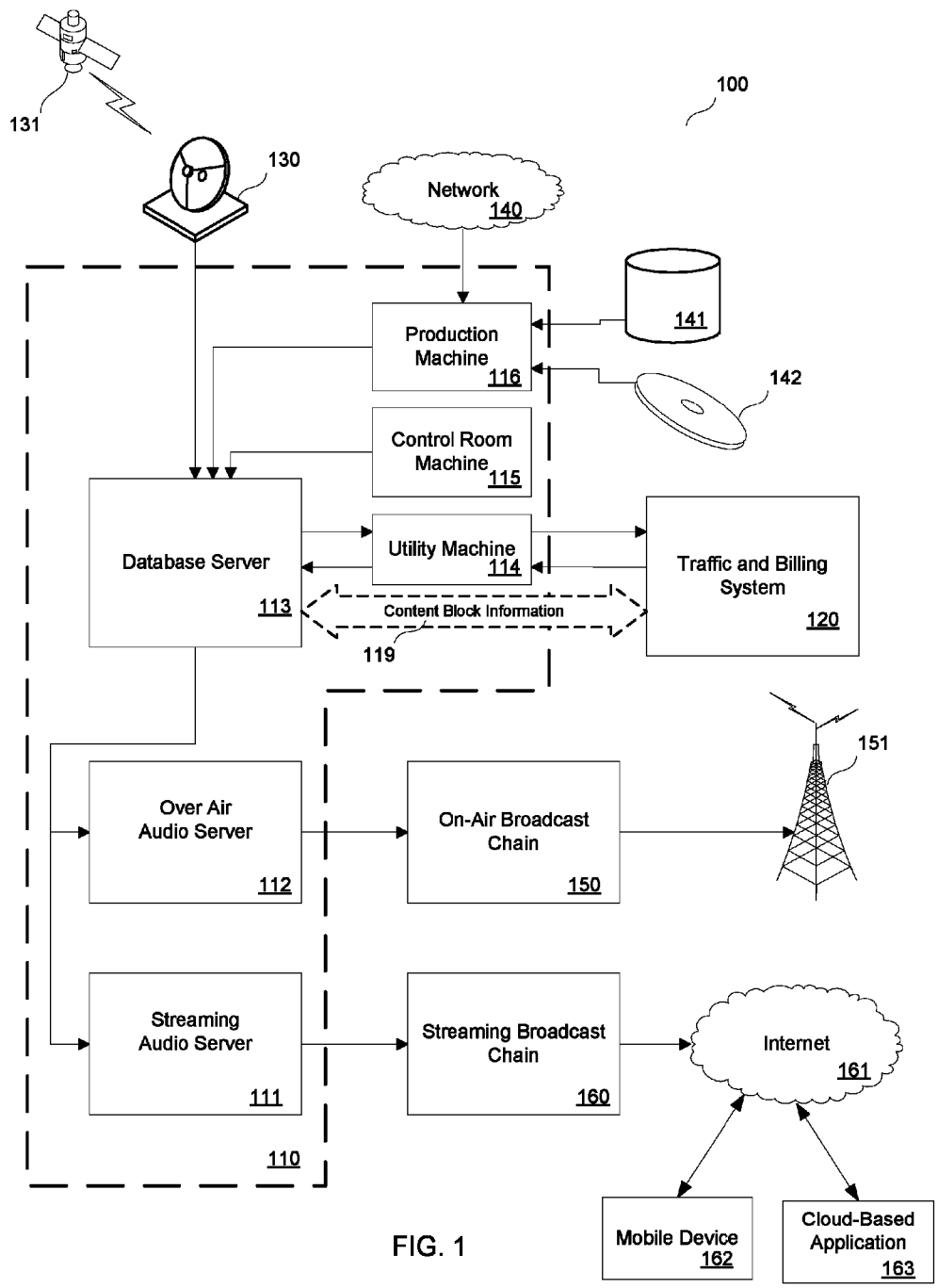
FIG. 1 is a block diagram illustrating a system according to various embodiments of the present disclosure.

Referring first to FIG. 1, a system 100 according to various embodiments of the present disclosure will be discussed. System 100 includes media automation system 110, which can be used to control and automate various media broadcast functions; and traffic and billing system 120, which is used to provide control for various traffic and billing functions such as entering and editing orders, and scheduling media items. System 100 also includes streaming broadcast chain 160, through which a streaming broadcast of media content can be provided to mobile device 162 and cloud-based applications 163 via a network such as Internet 161; on air broadcast chain 150, through which media content can be broadcast via a broadcast tower 151, and various media sources such as an individual source media 142, database 141, which can be used for bulk media storage, programming from another market and received via network 140, and programming broadcast via satellite 131, which can be received via satellite receiver 130.

In some embodiments mobile device 162 or a cloud-based application 163, for example iHeartRadio®, can interact with other elements of system 100 to obtain listener information, such as category preferences, locations, preferred media items, demographics information, explicit feedback regarding perishable (e.g. news, weather, and traffic) and non-perishable media items (e.g. songs, radio personalities, station identifiers and advertisements) delivered in content blocks. This information can be delivered, for example to database server 113 or another element of system 100, via a connection to Internet 161 that either includes streaming broadcast chain 160 and streaming audio server 111, or via a connection that bypasses one or both of streaming broadcast chain 160 and streaming audio server 111. The listener information can be used by database server 113, production machine 116, control room machine 115, utility machine 114, traffic and billing system 120, or by a content targeting system (not illustrated) to assist in selecting media to be provided in content blocks delivered to either or both streaming broadcast chain 160 or on air broadcast chain 150.

In other embodiments, cloud based application 163 can perform some or all of the functions performed by Database server 113, traffic and billing system 120, or other elements of system 110. For example, various requests and responses related to content block information 119 can be transmitted or received by cloud based application 163. In some embodiments, parts of the functionality of database server 113 related to streaming audio server 111, for example identifying under-filled content blocks and requesting media items for insertion in an under-filled content block can be performed instead by cloud based application 163.

Media automation system 110 includes production machine 116, which receives media content from network 140, database 141, individual source media 142; control room machine 115, and utility machine 114, each of which is connected to database server 113. Media automation system 110 also includes Over-Air audio server 112, which provides media content to on air broadcast chain 150; and streaming audio server 111, which provides audio content to streaming broadcast chain 160. Database server 113 can provide content to one or both of over-air audio server 112 and streaming audio server 111. In at least one embodiment, one or more of the illustrated servers can be implemented as virtual servers implemented on the same hardware as another of the illustrated servers. Furthermore, various distributed processing techniques can be used to spread functionality of one or more of the illustrated servers across multiple different machines.

In various embodiments, primary programming provided by streaming audio server 111 to streaming broadcast chain 116 is the same primary programming provided by over-air audio server 112 to on air broadcast chain 150. In many instances, however, particular media items included in the various content blocks provided to on air broadcast chain 150 and streaming broadcast chain 160 can vary, even though the length and timing of the content blocks themselves are generally consistent with each other. This variance can be a result of media consumer preferences, e.g. listener and viewer preferences; sponsor preferences; media availability; costs associated with providing the media, e.g. royalty fees and commissions; media distribution requirements imposed by copyright holders; or the like.

In some embodiments, media automation system 110 can be, for example, a radio automation system used to control media content broadcast via multiple different radio stations in a single market, with some or all system elements and subsystems co-located in a single physical facility. In other embodiments, media automation system 110 can be a radio automation system used to provide control of radio stations in different markets, in different locations, or via different distribution channels. In an illustrated embodiment, media automation system 110 is used to control media broadcast over the air via on-air broadcast chain 150 and broadcast tower 151, and streaming media provided to the Internet 161 via streaming broadcast chain 160.

In some embodiments, streaming broadcast chain 160 works in conjunction with a cloud-based application 163 to deliver individually or group personalized content blocks to various media consumers. In some embodiments, content provided by streaming broadcast chain 160 can be delivered to cloud-based application 163 prior to being delivered to Internet 161 or mobile device 162. Broadcast stations and delivery media in addition to those illustrated in FIG. 1 can also be controlled by media automation system 110. It should be appreciated that media automation system 110 can also be used with television and other types of media that may broadcast programming via multiple different stations or outlets.

Media automation system 110 can obtain media to be broadcast from various sources. For example, production machine 116 can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to database server 113. In addition to the media provided to database server 113 from production machine 116, satellite receiver 130 can also provide satellite content to be inserted into a broadcast via over-air audio server 112 and streaming audio server 111. Database server 113 can also receive media or other content to be broadcast from control room machine 115. Control room machine 115 may include a studio in which a live broadcast is being generated, such as a talk show or other similar live program, but control room machine 115 can also provide media to database server 113 other than live media.

Additionally, control room machine 115 can provide database server 113 with various control functions, and in some cases an operator can manually add or remove media items, programming, and other content that database server 113 has previously slotted for broadcast. Thus, for example, an operator in control room machine 115 may determine that a previously scheduled media item in a particular content block is not to be broadcast for any of various reasons. Upon making that determination, control room machine 115 can be used to send a signal to database server 113. In response to the signal, database server 113 can remove the media item from its previously scheduled content block. In some embodiments, the removed, or "bumped" media item by is not delivered to over-air audio server 112 for on air broadcast, nor is it delivered to streaming audio server 111 for streaming broadcast.

Traffic and billing system 120 is, in some embodiments, connected to database server 113 via a utility machine 114. In other embodiments, traffic and billing system may be connected to database server 113 through other machines, for example a control room machine 115, production machine 116, or directly connected to database server 113. In other embodiments, traffic and billing system 120 and database server 113 can be included in a single machine or in a collection of machines that are co-located or connected in a distributed fashion. In any event, traffic and billing system 120 can communicate content block information 119 to database server 113 and database server 113 can likewise communicate content block information 119 back to traffic and billing system 120

In various embodiments, content block information 119 can include requests for identification of potential media items available for inclusion in an under-filled content block, responses to such requests, bumped media item notifications, broadcast logs and lists, media item files, parameters related to available, unavailable, and potential media items, content block parameters, ranks, conditional information, various status information related to media items, and the like.

Content block information 119 can also include requests for commercial content, such as advertisements, and audio content associated with the commercial content. For example, it may be desirable to broadcast an advertisement between two other media items associated with the advertisement based on media consumer preferences, sponsor requirements, or using some other criteria. A request for content block information 119 can include a request for both the advertisement and the associated media items to be broadcast before and after the advertisement. Note that in some embodiments, the media items associated with the advertisement can be different for content blocks provided to different media consumers. Consider, for example, two iHeartRadio® listeners, one of which is an older man and one a younger woman. A hip-hop song popular with women under 25 can be associated with a travel advertisement included in a content block provided to the younger woman, while a classic rock song popular with men over the age of 50 can be associated with the same advertisement included in the content block provided to the older man.

In general, traffic and billing system 120 can be used to provide control and monitoring of the sale and scheduling of media items, and to determine which media items are to be played on which stations at particular times. This information can be provided in the form of a log file in some embodiments. Media automation system 110 can use database server 113 to gather programming and media information from various sources, and combine that information with content block information 119 to generate a log file indicating a substantially complete representation of which media and media items are to be broadcast. The log file and related information can be provided to both over-air audio server 112 and streaming audio server 111 for broadcast over their respective chains.

For example, programming provided from a satellite feed received through satellite receiver 130 will generally have breaks in its programming. The beginning and end of these breaks can be identified by dual-tone multi-frequency (DTMF) tones provided with the programming, or determined through various other means. Content block information 119, can include the identity of various media items that are available to be played on particular stations during particular times, the priority of the media items in relationship to each other, and other similar information, which can be used to schedule media items into appropriate breaks in the programming.

In some instances, media items played over streaming broadcast chain 160 can be different than media items played over on-air broadcast chain 150, even though the programming and the breaks between various programming and media items are the same. Thus, a first content block to be broadcast over on-air broadcast chain 150 by over-air audio server 112 may include three media items to be played from 10:00 AM to 10:03 AM on a particular date. A second content block to be broadcast over streaming broadcast chain 160 may include two of the same media items included in the first content block, with the third media item reserved for media targeted to an Internet audience.

Due to various circumstances, one or more media items, and in some cases entire content blocks, may be removed from a particular block. Control room machine 115 can be used to notify database server 113 if a particular media item, or content block, is to be the removed, if items are deemed not valid for airplay based on metadata entered by station staff or other individual, if an item is removed because it is missing audio, if an item is automatically skipped for administrative purposes, or otherwise. In some embodiments, such notification takes the form of a bumped-media item signal.

Because media broadcast stations can derive revenue from broadcasting certain media items, any media items removed should be later reinserted into the media stream if possible, so that revenue for that media items is not lost. But because different media items can be included in corresponding content blocks on different stations, or on the same station being broadcast over different chains, reinserting bumped media items can require a close coordination between the media automation system and the media traffic system. Some media items, whether paid or not, may have a higher priority than other similar media items, and are generally referred to herein as "priority media items." In some cases it is desirable to reinsert priority media items that have been removed from the media stream.

Close coordination and reporting can also be important to make sure that various scheduling and marketing parameters associated with reinserted priority media items are satisfied. In at least one embodiment, traffic and billing system 120 can maintain information regarding scheduled media items that should be played either at certain times of day, on certain days of the week, media items that should be played in conjunction with various other media items, media items having priority over other media items with the same or similar parameters, or media items whose placement in a content block or is otherwise constrained.

In some instances, particularly with regards to a streaming broadcast chain 160 provided through streaming audio server 111, some of the content blocks scheduled for play later in the day, may be under-filled, meaning that a sufficient number of media items have not yet been scheduled to fill the time allotted for a break between, or within, various different media programs. In some cases, if priority media items, e.g. paid advertisements, meeting the requirements of a particular under-filled content block are not available, media automation system 110 will insert unpaid or lower priority filler, e.g. a public service announcement, into the available space. However, if one or more of the previously bumped priority media items meet the criteria necessary for being broadcast in the under-filled content block, those priority media items can be inserted into the under-filled content block to allow media automation system 110 to recover revenue that may otherwise have been lost.

To make these previously bumped media items available for inclusion in under-filled content blocks, database server 113 can provide information to traffic and billing system 120 related to media items that have been removed. Traffic and billing system 120 can collect and store information about bumped media items that may be available for future inclusion in under-filled content blocks. Over-Air audio server 112 or streaming audio server 111 can notify database server 113 of under-filled content blocks, and request database server 113 to provide content to be included in those under-filled content blocks. Database server 113 can, in turn, request traffic and billing system 120 to search through its collection of available priority media items to identify potential media items that are available for inclusion in the under-filled content block. Traffic and billing system 120 can return the requested information to database server 113, which will in some embodiments select which of the potential media items to be included in the under-filled content block. Database server 113 can provide the media item to the appropriate server for broadcast, and send a message back to traffic and billing system 120 indicating which of the potential media items were chosen for inclusion in the under-filled content block. Traffic and billing system 120 can then update its list of available media items to indicate that a selected media item has already been rescheduled for broadcast in the under-filled content block.

In some embodiments, filling under-filled content blocks is performed automatically, and on a time scale that can be impractical if human intervention or decision making is required. Thus, for example, an under-filled content block in the following minutes can be filled with a media item bumped during the previous minutes. In some cases, a bumped media item can be placed in the next content block playing on the same station if, for example, the next content block includes unpaid filler, lower priority media items, or under other circumstances as desired.

It will be appreciated that various systems can be used to implement the teachings set forth herein, and are not limited to the systems discussed with reference to FIG. 1. For example, although at least one embodiment includes separate traffic and billing systems, similar functionality can be provided using a single, integrated or system having one or more local or distributed processing, storage and communication elements. In some embodiments, system 100 can be implemented as a centralized system for reporting and rules-based media placement, which implements media placement instructions using a centralized inventory of commercial spots and media items that can be used to fill open avails. Thus, although embodiments including automation and traffic systems are primarily discussed herein, other embodiments can be implemented without the need for cooperation between separate automation and traffic systems.

Figure 2:
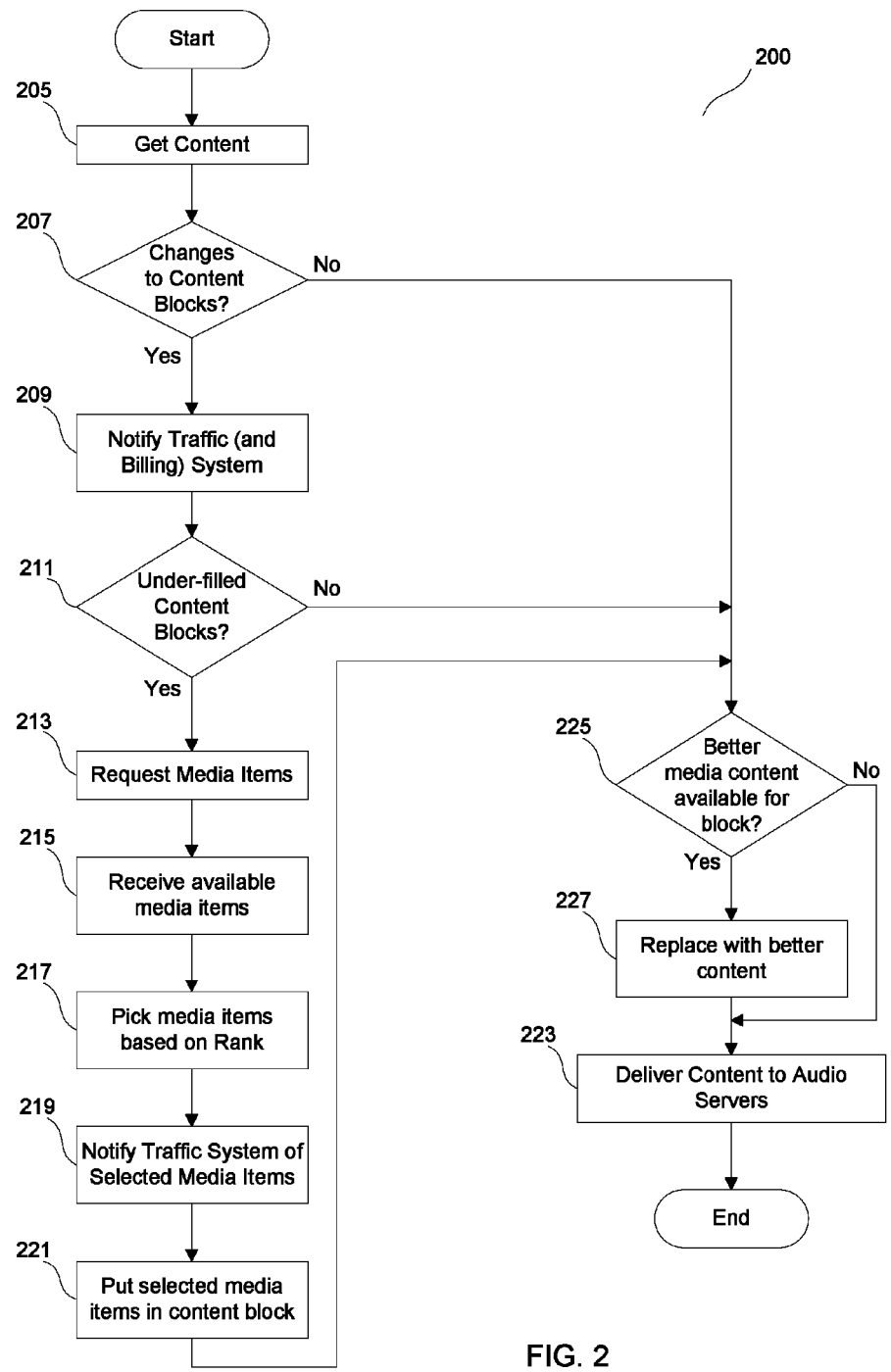
FIG. 2 is a flow chart illustrating a method for use in a media automation system according to various embodiments of the present disclosure.

Referring next to FIG. 2, a method 200 for use in a media automation system according to various embodiments of the present disclosure is discussed. As illustrated by block 205, media automation system 110 receives content from various sources, which can include media items and programming, paid and unpaid media items, live content, or other content to be broadcast via any of various distribution channels. In some embodiments, media automation system 110 proves a centralized pool of commercial spots and media content, from which media items can be selected to fill open spots in content blocks. As illustrated by block 207, media automation system may make changes to content blocks as a result of manual or automated input from any of various sources, including media consumer and sponsor preferences or requirements. These changes can include removal or addition of one or more media items from one or more content blocks, or removal/addition of an entire content block.

As illustrated by block 209, a media automation system can notify the traffic and billing system of changes that were made to the content blocks. In at least one embodiment, both paid and unpaid media items bumped by the media automation system are reported to the traffic and billing system using a bumped-media item signal, while in other embodiments only paid media items are reported. In some embodiments, a performance of media items and content blocks can be reported back to the traffic and billing system, or another subsystem of system 100, by an independent or integrated performance measurement and reporting system. The traffic and billing system can keep track of any bumped media items by flagging or otherwise marking the media items to indicate their availability for inclusion in other content blocks. Other circumstances in which a bumped-media item signal may be sent to the traffic and billing system include, but are not limited to, items being deemed not valid for airplay based on metadata entered by station staff or another individual, an item being removed because of missing audio, and cases where items are automatically skipped for administrative purposes.

As illustrated by block 211, the media automation system can determine whether there are any under-filled content blocks that might require additional priority media items to fill them. The determination can be made by a subsystem of the media automation system, or by an external system that reports information to the media automation system. Thus for example a streaming audio server, which may be of the same media automation system as a database server, can notify the database server that additional media items are required to fill currently under-filled content blocks. In other embodiments, a system not under control of the media automation system can send a message to the media automation system notifying the system that additional media items can be accommodated. In addition to providing notification that additional media items can be accommodated, the message may contain listener data related to a particular media consumer or group of media consumers. The listener data can include information that allows the media automation system to provide better targeting of media items, such as music, advertisements, and other perishable and non-perishable content, so that the media included in a content block better represents the preferences or other personalization for the media consumer or group of media consumers.

As illustrated by block 213 media automation system can request priority media items from a traffic or traffic and billing system for inclusion in one or more under-filled content blocks. In some embodiments, the request for priority media items can also include various parameters an acceptable media item must meet for inclusion in the content block in question. Thus, for example, a request for additional priority media items for an under-filled content block may indicate a start and a stop time of the content block, a station identifier, a date on which the content block is to air, the length of the content block to be filled, and a content block identifier. Other content block parameters can be provided in conjunction with, or as part of, the request sent from the automation system to the traffic system if desired. An example of parameters that may be provided in conjunction with the request for priority media items include various requirements for types of content block content, including, an industry associated with the content block, media items that may be required or prohibited to be played in a particular content block, or the like.

In various embodiments, parameters and preferences received from media consumers using a cloud based application such as iHeartRadio® can be used to assist in establishing the priority of a media item. In some such embodiments, the closer a media item matches a media consumer's profile, demographics and preferences, the higher the priority assigned to a media item. Consequently, the closer a media item matches a media consumer's preferences, the more likely that media item is to be included in a content block provided to that media consumer.

The request illustrated by block 213 can also include requests for media content associated with a specific media item to be included in a content block. The request can identify a particular media item and generally request, "at least one media item associated with the particular media item," or the request can specifically identify the associated media items requests. For example, a request for associated media items can identify a specific media item predicted to be preferred by a particular listener, or request any song currently meeting a threshold rank (e.g. top 10) for a targeted group of listeners.

As illustrated at block 215, the media automation system can receive a log, list, or other indication of potential media items available for inclusion in a particular content block from the traffic and billing system. In some such embodiments, the media items are pre-ranked by the traffic and billing system, based on a media item rate, a campaign identifier or another suitable parameter. In other embodiments, information useful in ranking the particular media items is provided to the media automation system from the traffic and billing system so that the media automation system itself can rank the media items if desired.

As illustrated by block 217, the media automation system can choose media items to include in particular content blocks based on a media item's rank, with media items having a higher rank being selected for inclusion in favor of media items having a lower rank. A media item's rank may be based on its rate, which can facilitate selection of media items providing greater revenue. In other embodiments, selecting media items based on rank can allow preferred media items to be selected based on a campaign with which the media item is associated, or otherwise.

As illustrated by block 219, the media automation system can notify the traffic and billing system regarding which media items the media automation system has selected for inclusion in particular content blocks using a consumed-media item signal. In some embodiments, information regarding the content block for which a media item was selected for placement is included in a message to the traffic and billing system. In other embodiments, the traffic and billing system is notified of the fact of selection without reference to a particular content block. Various combinations of information can be sent from the automation system to the traffic system in the consumed-media item signal to achieve various goals consistent with the teaching set forth herein.

As illustrated by block 221, a media automation system inserts the selected media items into the under-filled content blocks and prepares to deliver the content block to the audio servers. As illustrated by block 225, in some embodiments a final check can be made to determine whether or not the selected media items included in a content block are still the best available media items. If better media items are available, the content block can be modified, as illustrated by block 227, prior to the content block being delivered to the media servers as illustrated by block 223. The determination of whether a media item is better can be made based on media consumer demographics, sponsor requirements, changed circumstances, or the like. For example, if the content block originally included a news story about a sporting event, but an updated news story was received after the original news story was selected for inclusion in the content block, the newly updated news story can be substituted for the original news story. Likewise, if a consumer updated his preferences between the time media items were selected for the content block and the time the content block is delivered to an audio server, the content block can be updated to reflect the updated preferences.

It will be appreciated that additional actions can be performed as part of method 200 without departing from its spirit and scope. For example, in the event that no usable priority media items are available, unpaid fill can be inserted into an under-filled content block prior to delivering the media content to the respective media servers as shown in block 223. Likewise, although not specifically illustrated, if original content is replaced with better content at block 227, the traffic system can be notified of the changes. Furthermore, a performance indicator associated with a consumed media item, such as an advertisement or song, can be included in a report back to the system once a media item in the content block has been consumed. In some cases once all or part of a content block has been consumed, a performance indicator associated with the content block as a whole can be delivered and used to assist determining which media items should be included in a particular content block.

Figure 3:
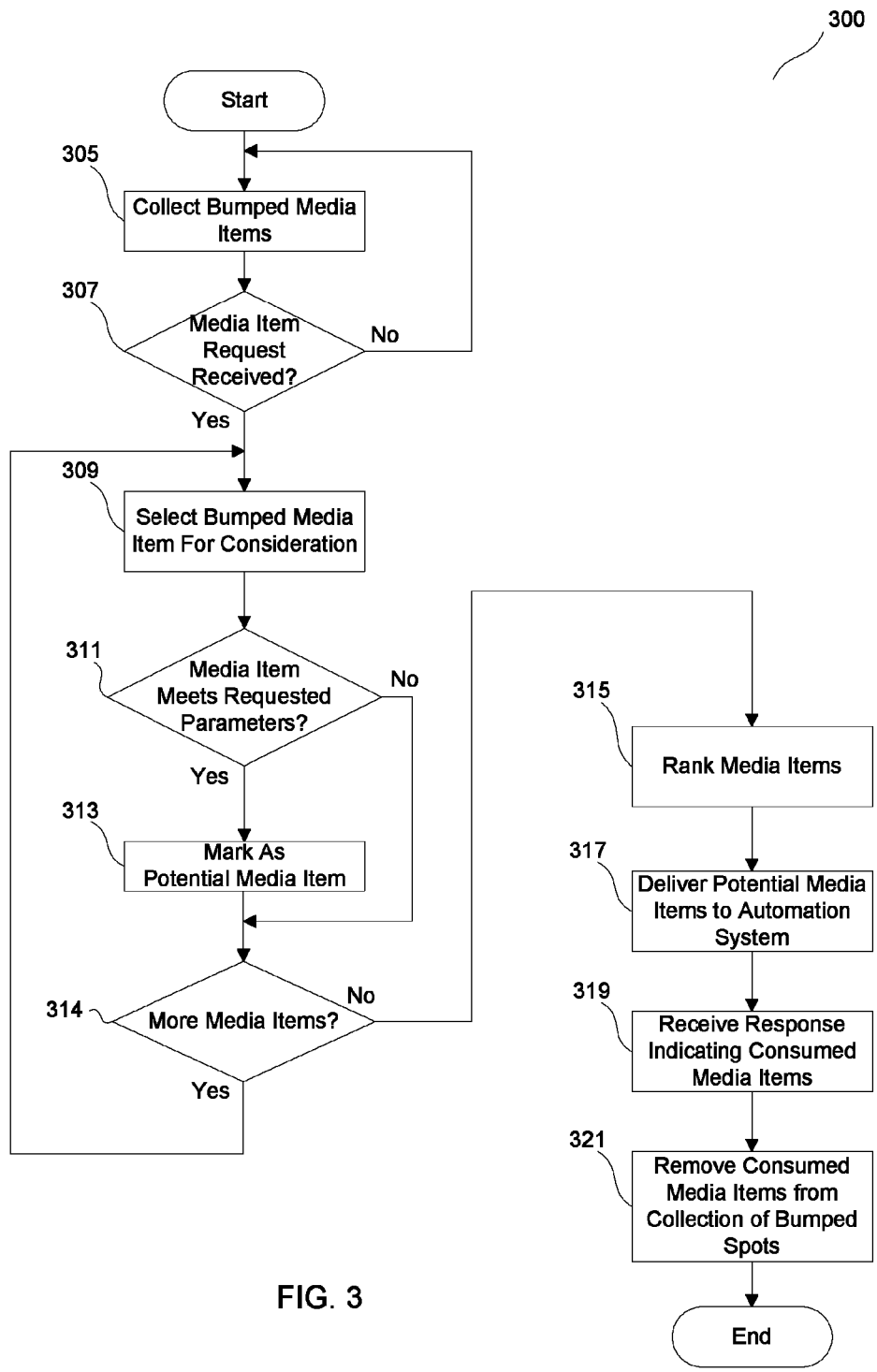
FIG. 3 is a flowchart illustrating a method for use in a media traffic system according to various embodiments of the present disclosure.

Referring next to FIG. 3 a method 300 for use in a media traffic system according to various embodiments of the present disclosure will be discussed. Method 300 begins as illustrated at block 305 with a media traffic system collecting bumped media items. In some embodiments, the bumped media items may be literally collected by storing the bumped media items as files in a single physical location. Collection of bumped media items can also be performed by storing a collection of pointers to the bumped media items. In yet other embodiments, the bumped media items can be collected by storing a list, table, or other collection of identifiers associated with bumped media items. In at least some embodiments, collecting bumped media items includes marking, flagging, or otherwise identifying particular bumped media items as available for use, or indicating that particular bumped media items have already been selected for inclusion in a content block.

As illustrated by block 307, a media traffic system can periodically, aperiodically, or otherwise check to see if a request for available potential media items has been received from a media automation system or otherwise. If no request has been received method 300 continues to collect bumped media items and check for requests.

As illustrated by block 309, in response to a request for potential media items, a media traffic system can begin selecting media items to respond to the automation system's request by choosing a particular bumped media item for consideration. As illustrated by block 311, characteristics of the bumped media item chosen for consideration can be compared to content block or other parameters to determine whether the media item meets the criteria specified in the received request. In at least some embodiments, the parameters can include a parameter indicating the media item's rate, a start and end time of the content block, space available to be filled within the content block, a content block identifier, other media items currently scheduled to play within the content block, or the like.

As illustrated by block 313, if a bumped media item chosen for consideration satisfies the parameters supplied in conjunction with the received request, the media item can be marked as a potential media item, for future delivery to a media automation system. As illustrated by block 314 a check can be made to determine if there are more media items yet to be considered. If there are, method 300 returns to block 309 and chooses another bumped media item for consideration. This process can continue iteratively until a designated number of potential media items are identified, until there are no more media items to be considered, or until another stop condition is encountered.

As illustrated by block 315, media traffic system can rank the potential media items prior to delivering them to a media automation system. The media items can be ranked based on the parameters provided in conjunction with the request, or in some embodiments based on an advertising or other rate associated with the media item. In some such embodiments, all potential media items in the collection of bumped media items can be ranked so that the media item with the highest rate has the highest rank, while the media item with the lowest rate has the lowest rank. Ties in ranking based on the rate can be handled by making one or more of the parameters received with the request a tie-breaking consideration, or all media items having the same rate can be considered to have the same rank. Thus, in some embodiments it is possible that all potential media items identified by a media traffic and billing system will have the same rank. In such a case, the potential media items can be ordered alphabetically, using a first-in-first-out (FIFO) process, or using another desired sorting mechanism.

As illustrated by block 317, potential media items can be delivered to the media automation system. Delivery of the media items to the automation system may include delivery of the log, delivery of physical media files, delivery of the list, delivery of pointers, or delivery of other information that will allow media automation system to obtain the identified media items. In at least one embodiment, a log file including identifiers is delivered to the media automation system.

As illustrated by block 319, at some point after delivering the potential media items to an automation system, a response can be received at the traffic system indicating which of the potential media items have been chosen by the automation system for inclusion in under-filled content blocks. The notification may include a change log, a list, pointers, or any other suitable mechanism to identify the potential media items actually consumed.

As illustrated by block 321, in response to receiving an indication of the consumed media items, the identified media items can be removed from the collection of bumped media items. Removal from the collection of bumped media items may include actual physical removal the file, changing of the pointer, setting or resetting a flag, or performing some other action allowing the media traffic system to identify which of the collected bumped media items are no longer available, and should not be provided in response to future media item requests. Additionally, the indication of the consumed spot or media content may include report back to the system on the performance of the commercial content once the content has been consumed.

Figure 4:
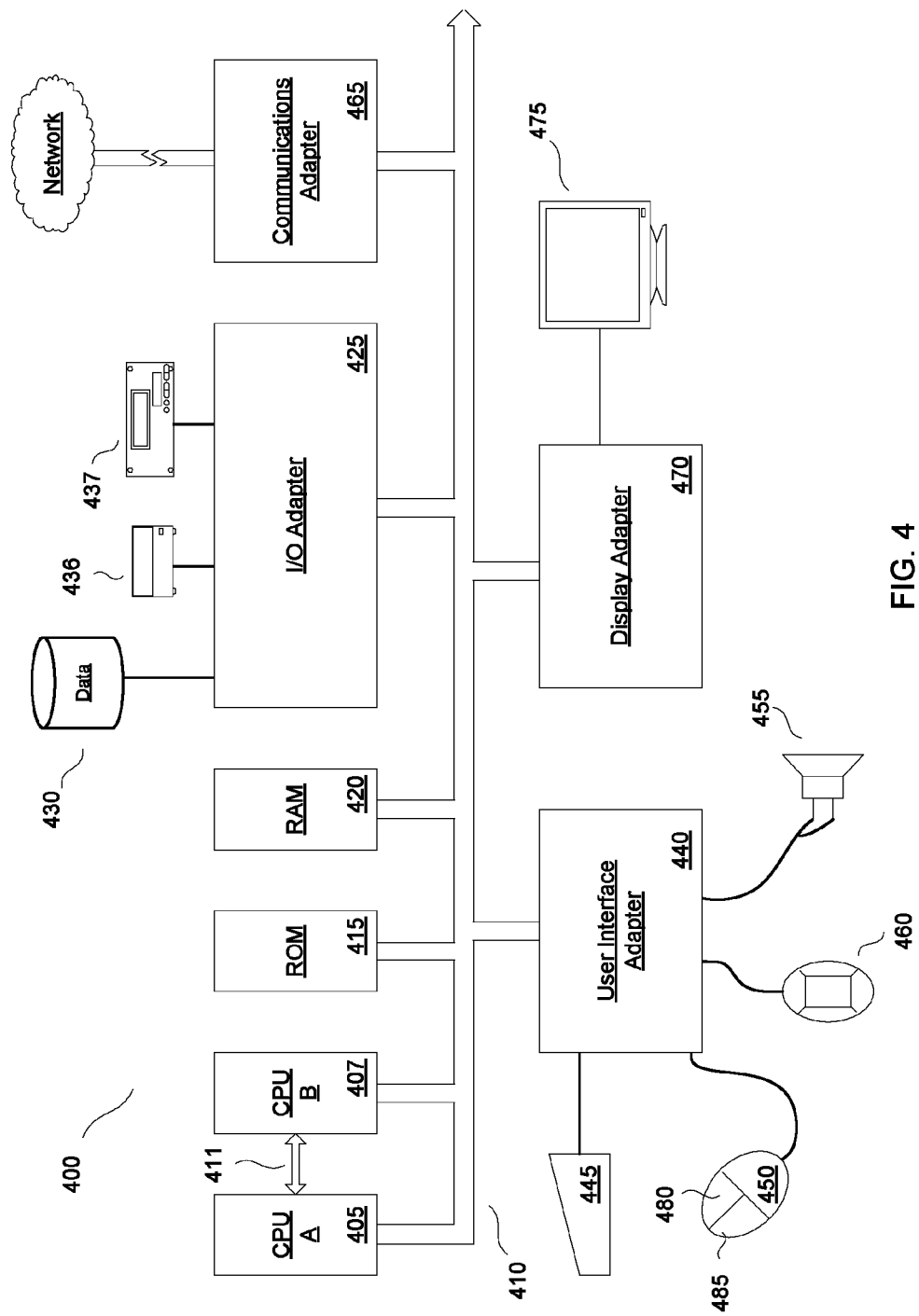
FIG. 4 is a high level block diagram of a processing system according to an embodiment of the present disclosure.

Referring now to FIG. 4, a high-level block diagram of a processing system is illustrated and discussed. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any tangible apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for providing media items to be included in under-filled content blocks. Other variations and modifications of the embodiments disclosed may be made based on the description provided, without departing from the scope of the invention as set forth in the following claims.

The invention claimed is:

1. A method implemented using a media automation system, the method comprising:
transmitting a request from a database server to a traffic and billing system, the request including a request to search a collection of priority media items to identify first media items for potential inclusion in an under-filled content block;
receiving a message from the traffic and billing system in response to the request, the message identifying the first media items;
the database server responding to the message by:
selecting at least one media item of the first media items for insertion in the under-filled content block;
inserting the at least one media item in the under-filled content block to generate a filled content block;
transmitting a signal identifying the at least one media item to the traffic and billing system;
prior to delivering the filled content block to a content server, determining that the at least one media item is to be replaced by a substitute media item;
in response to the determining:
inserting the substitute media item into the filled content block in place of the at least one media item; and
delivering the filled content block to a media server.

2. The method of claim 1, wherein:
the determining includes identifying a more recent version of the at least one media item; and
using the more recent version of the at least one media item as the substitute media item.

3. The method of claim 1, wherein:
the determining includes identifying a different media item based on changed consumer demographics; and
using the different media item as the substitute media item.

4. The method of claim 1, wherein:
the determining includes identifying a different media item based on consumer preferences obtained after inserting the at least one media item in the under-filled content block, but before delivering the filled content block to a media server; and
using the different media item as the substitute media item.

5. The method of claim 1, further comprising:
adding the at least one media item to a collection of bumped media items in response to the determining.

6. The method of claim 1, further comprising:
selecting the substitute media item from a collection of bumped media items.

7. The method of claim 1, further comprising:
selecting the substitute media item based on other media items scheduled to play within the filled content block.

8. A media automation system comprising:
a traffic and billing system configured to transmit a message to a database server, the message identifying media items available for insertion in one or more content blocks;
the database server configured to respond to the message by:
selecting one or more of the media items to be inserted in the one or more content blocks;
inserting at least one media item of the one or more media items in an under-filled content block to generate a filled content block;
transmit a signal to the traffic and billing system identifying the one or more of the media items selected;
the database server further configured to:
determine that the at least one media item is to be replaced by a substitute media item;
insert the substitute media item into the filled content block in place of the at least one media item;
deliver the filled content block to a media server; and
a streaming media server configured to broadcast the filled content block to a mobile device via a streaming broadcast chain.

9. The media automation system of claim 8, wherein the database server is further configured to:
identify a more recent version of the at least one media item; and
use the more recent version of the at least one media item as the substitute media item.

10. The media automation system of claim 8, wherein the database server is further configured to:
identify a different media item based on changed demographic requirements; and
use the different media item as the substitute media item.

11. The media automation system of claim 8, wherein the database server is further configured to:
identify a different media item based on consumer preferences obtained after inserting the at least one media item in the under-filled content block, but before delivering the filled content block to the streaming media server; and
using the different media item as the substitute media item.

12. The media automation system of claim 8, wherein the database server is further configured to:
add the at least one media item to a collection of bumped media items in response to inserting the substitute media item into the filled content block in place of the at least one media item.

13. The media automation system of claim 8, wherein the database server is further configured to:
select the substitute media item from a collection of bumped media items.

14. The media automation system of claim 8, wherein the database server is further configured to:
select the substitute media item based on properties associated with other media items scheduled to play within the filled content block.

15. A database server comprising:
a processor;
a network interface coupled to the processor and a cloud-based media application via a communications network;

memory operably associated with the processor, the memory configured to store a program of instructions to be executed by the processor, the program of instructions including:

at least one instruction to receive end-user preferences from the cloud-based media application, the end-user preferences associated with user-preferred media content;

at least one instruction to transmit a request to a traffic and billing system, the request including a request to search a collection of media items to identify first media items for potential inclusion in a content block, wherein the request includes information associated with the end-user preferences;

at least one instruction to receive a message from the traffic and billing system in response to the request, the message identifying the first media items;

at least one instruction to respond to the message from the traffic and billing system by:
  selecting at least one media item of the first media items for insertion in an under-filled content block;
  inserting the at least one media item in the under-filled content block to generate a filled content block;

at least one instruction to determine, after inserting the at least one media item in the under-filled content block, but prior to delivering the filled content block to a content server, that the at least one media item is to be replaced by a substitute media item;

at least one instruction to insert the substitute media item into the filled content block in place of the at least one media item; and at least one instruction to deliver the filled content block to a media server.

16. The database server of claim 15, wherein the program of instructions further includes:
  at least one instruction to identify a more recent version of the at least one media item; and
  at least one instruction to use the more recent version of the at least one media item as the substitute media item.

17. The database server of claim 15, wherein the program of instructions further includes:
  at least one instruction to identify a different media item based on changed consumer demographics; and
  at least one instruction to use the more recent version of the at least one media item as the substitute media item.

18. The database server of claim 15, wherein the program of instructions further includes:
  at least one instruction to identify a different media item based on consumer preferences obtained after inserting the at least one media item in the under-filled content block, but before delivering the filled content block to a media server; and
  at least one instruction to use the more recent version of the at least one media item as the substitute media item.

19. The database server of claim 15, wherein the program of instructions further includes:
  at least one instruction to add the at least one media item to a collection of bumped media items in response to the at least one instruction to determine.

20. The database server of claim 15, wherein the program of instructions further includes:
  at least one instruction to select the substitute media item based on other media items scheduled to play within the filled content block.

* * * * *